2,770,634
Patented Nov. 13, 1956

2,770,634

METHOD OF PRODUCING VINYLCHLORO-SILANES

Donald R. Weyenberg, Midland, Mich., assignor to Dow Corning Corporation, Midland, Mich., a corporation of Michigan No Drawing. Application July 17, 1953,
Serial No. 368,822

5 Claims. (Cl. 260—448.2)

This invention relates to the production of vinylchlorosilanes by the reaction of vinylchloride with hydrogen-containing silanes.

Heretofore, vinylchlorosilanes have been produced by a number of methods. These include the reaction of vinylchloride with silicon, the reaction of acetylene with trichlorosilane and the cracking of propyl or butyl chlorosilanes.

The first and last of these methods give relatively poor yields of vinylchlorosilanes. The second method is hampered by the fact that acetylene is a potentially hazardous material to handle and thus necessitates the use of rather elaborate equipment. The present invention deals with a commercially feasible method of preparing vinylchlorosilanes in excellent yields employing simple equipment.

The present method involves the reaction of vinylchloride with certain hydrogen-containing silanes. Prior to this invention the art taught that the reaction of an unsaturated organic compound with a hydrogen-containing silane would produce a product by the addition of a silicon and hydrogen of the silane across the double bond of the unsaturated compound. For example, trichlorosilane plus ethylene gives ethyltrichlorosilane and trichlorosilane plus allylchloride gives gammachloropropyltrichlorosilane. In accordance with this teaching it would be expected that the reaction of vinylchloride with trichlorosilane would give monochloroethyltrichlorosilane. Applicant has found, however, that under the conditions of this invention a different product is obtained.

It is known from C. L. Agre, JACS, 71 (1949), page 300, that dichlorovinyltrichlorosilane is obtained when trichloroethylene is reacted with trichlorosilane at 500° C. It has been found, however, that serious decomposition takes place when the temperature of the reaction is boosted substantially above 500° C. For example, when trichloroethylene is reacted with methyldichlorosilane at 550° C. at atmospheric pressure for a period from 10 to 12 seconds, the product is an equi-molar mixture of dichlorovinyltrichlorosilane and methyltrichlorosilane. Furthermore, pyrolytic decomposition of the reaction mixture occurs to such an extent that the reaction tube will plug in about two hours. Thus, the reaction disclosed by Agre cannot be carried out commercially at 550° C. or above.

Whereas, the yield of dichlorovinyltrichlorosilane decreases rapidly, in the above reaction, when the temperature is raised above 500° C., applicant has found that contrary to all expectations the reverse is true when vinylchloride is reacted with hydrogen-containing silanes. Not only does the yield of the desired vinyltrichlorosilane increase rapidly with temperature but there is no coking. Consequently, the present method is eminently adaptable for commercial use.

The primary object of this invention is to provide a simple and cheap method for the production of vinylchlorosilanes.

In accordance with this invention a mixture of vinylchloride and a silane of the formula $R_aSiHCl_{3-a}$, where R is an alkyl radical of less than 5 C atoms or a phenyl radical and $a$ has a value from 0 to 1 inclusive, is reacted at a temperature of from 550° to 650° C. for at least two seconds at a pressure below three atmospheres.

The reaction of this invention may be represented by the following equation:

$$CH_2=CHCl + R_aSiHCl_{3-a} \rightarrow (CH_2=CH)R_aSiCl_{3-a} + HCl$$

When the above conditions are adhered to excellent yields of the corresponding vinylchlorosilanes are obtained. However, commercially acceptable yields of the desired vinylchlorosilanes are not obtained at temperatures below 550° C. or above 650° C. At temperatures below 550° C., little or no reaction takes place while at temperatures above 650° C. excessive decomposition and rearrangement occur to give undesirable by-products such as silicon tetrachloride and methyltrichlorosilane.

The pressure employed in this invention must be below three atmospheres because above that pressure satisfactory results are not obtained. However, there is no critical lower limit to the pressure. Subatmospheric pressures may be employed if desired. In general, satisfactory yields are obtained by carrying out the reaction at atmospheric pressures. However, the use of slightly increased pressure improves the volume efficiency of the apparatus and thus may be desirable in commercial operation.

The time of reaction required at the temperatures of this invention is at least two seconds. In general, optimum yields are obtained at contact times ranging from 5 to 20 seconds although longer times may be employed if desired.

Either trichlorosilane or organochlorosilanes in which the organic group is alkyl or phenyl can be employed in this invention. It is to be understood that either single chlorosilanes or mixtures of two or more chlorosilanes can be used. Specific examples of organochlorosilanes which are operative are methyldichlorosilane, ethyldichlorosilane, propyldichlorosilane, butyldichlorosilane and phenyldichlorosilane.

The reactants may be fed into the reaction zone separately or they may be fixed prior to the reaction. The reactants may be added either as liquids or as vapors. The relative proportions of vinylchloride and the silane are not critical although, in general the best yields of vinylchlorosilanes are obtained when a ten to twenty mol percent excess of vinylchloride is employed.

The reaction of this invention may be carried out in any suitable apparatus. In general, it is sufficient to pass the reactants through a tube heated to the specified temperatures. If desired, the tube may be packed with inert packing such as clay chips, glass wool, or diatomaceous earth. The reaction vessel may be of either ceramic or metal construction.

The vinylchlorosilanes made by the method of this invention are useful per se for rendering ceramic materials water repellant and for sizing glass fabrics. They are also useful as intermediates in the preparation of vinylpolysiloxanes.

The following examples are illustrative only and should not be construed as limiting the invention which is properly delineated in the appended claims.

EXAMPLE 1

Vinylchloride and the chlorosilanes specified in the table below were fed separately into an electrically-heated quartz tube having an inside diameter of 1" and a length of 4'. The reaction products were condensed and identified by analytical distillation. In each of the runs, except run 1, the percent yield is based upon the amount of chlorosilane added. In run 1 the yield is based upon the amount of vinylchloride employed. The by-product in run 1 was silicontetrachloride, in runs 2, 3, and 4 it was methyltrichlorosilane and in run 5 it was phenyltrichlorosilane. The mol percent of by-product is based upon the amount of chlorosilane employed. For example, in run 1 the amount of SiCl$_4$ by-produced was equivalent to 5.4 mol percent of the HSiCl$_3$ added to the reaction vessel.

Table

| | Chlorosilane | Amt. of Reactants in Grams | | Temp. in ° C. | Cont. Time in Secs. | Products | Mol Percent Yd. of Prod. | Mol Percent By-Prod. | Mol Percent Starting Chlorosilane Recovered |
|---|---|---|---|---|---|---|---|---|---|
| | | Chlorosilane | Vinylchloride | | | | | | |
| 1 | HSiCl$_3$ | 688 | 190 | 600 | 14.2 | ViSiCl$_3$ | 53 | 5.4 | 33.9 |
| 2 | MeSiHCl$_2$ | 958 | 693 | 550 | 5.6 | ViMeSiCl$_2$ | 22.4 | 1.6 | 54.4 |
| 3 | MeSiHCl$_2$ | 840 | 601 | 600 | 10.5 | ViMeSiCl$_2$ | 59.1 | 1.9 | 17.1 |
| 4 | MeSiHCl$_2$ | 401 | 299 | 650 | 10.2 | ViMeSiCl$_2$ | 35 | 8.6 | 19.5 |
| 5[1] | PhSiHCl$_2$ | 686 | 385 | 550 | 10.2 | ViPhSiCl$_2$ | 29.7 | 3.3 | 36.6 |

[1] In run 5 the products were identified by infrared analysis.

EXAMPLE 2

When 5 mols of ethyldichlorosilane is reacted with 3 mols of vinylchloride at a temperature of 600° C. for 10 seconds at atmospheric pressure, vinylethyldichlorosilane is obtained.

That which is claimed is:

1. A method of preparing vinylchlorosilanes which comprises, heating a mixture of vinylchloride and a chlorosilane of the formula R$_a$SiHCl$_{3-a}$, where R is selected from the group consisting of alkyl radicals of less than 5 C atoms and phenyl radicals and $a$ has a value from 0 to 1 inclusive, at a temperature of from 550° C. to 650° C. for at least two seconds at a pressure below three atmospheres.

2. The method in accordance with claim 1 where the chlorosilane is trichlorosilane.

3. The method in accordance with claim 1 where the chlorosilane is methyldichlorosilane.

4. The method in accordance with claim 1 where the chlorosilane is ethyldichlorosilane.

5. The method in accordance with claim 1 where the chlorosilane is phenyldichlorosilane.

References Cited in the file of this patent

UNITED STATES PATENTS

| 2,379,821 | Miller | July 3, 1945 |
| 2,574,390 | Hatcher | Nov. 6, 1951 |
| 2,632,013 | Wagner | Mar. 17, 1953 |
| 2,637,738 | Wagner | May 5, 1953 |

FOREIGN PATENTS

| 961,878 | France | Nov. 28, 1949 |

OTHER REFERENCES

Agre: "Jour. Am. Chem. Soc.," vol. 71 (1949), pages 300–304.